Nov. 27, 1962 — G. T. RANDOL — 3,065,603
POWER-ASSISTED OPERATING MECHANISM FOR HYDRAULIC PRESSURE SYSTEMS
Filed May 8, 1957 — 5 Sheets-Sheet 1
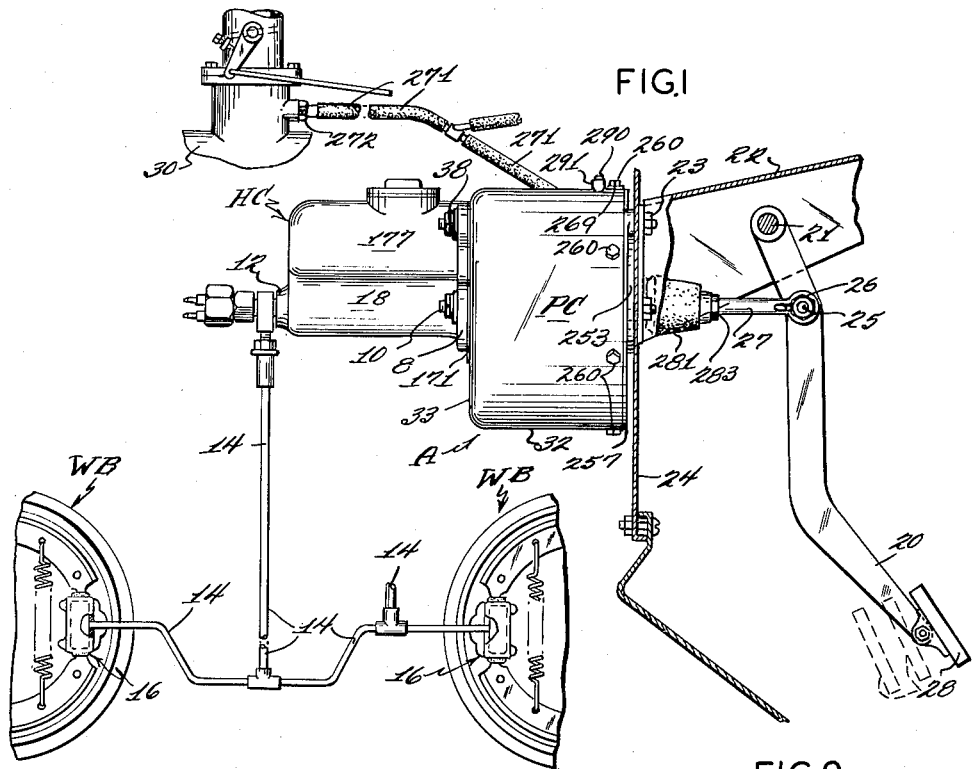
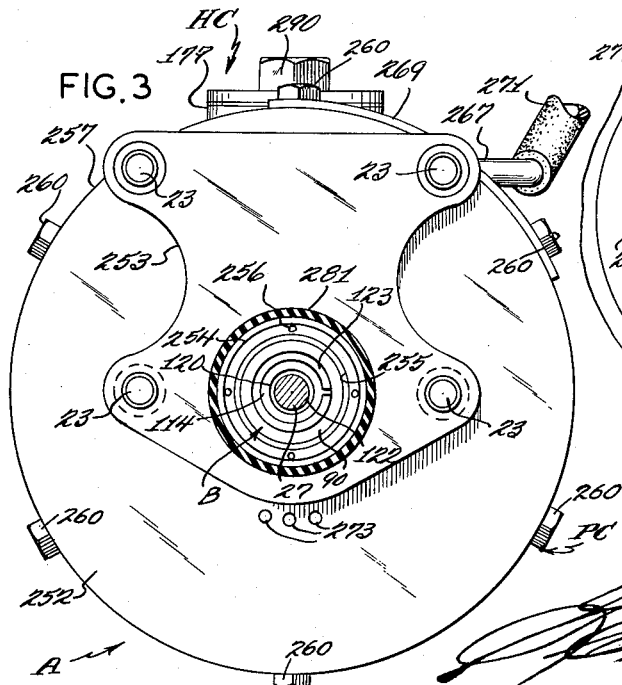
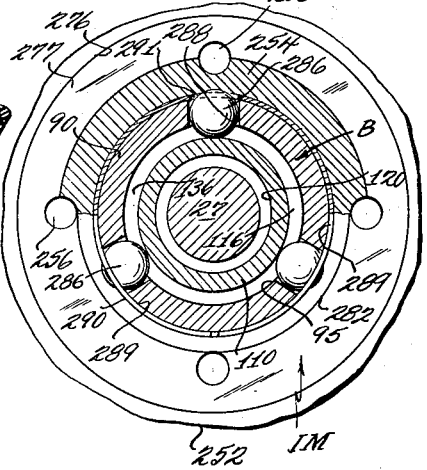
Inventor Nov. 27, 1962
G. T. RANDOL
3,065,603
POWER-ASSISTED OPERATING MECHANISM FOR
HYDRAULIC PRESSURE SYSTEMS
Filed May 8, 1957
5 Sheets-Sheet 2
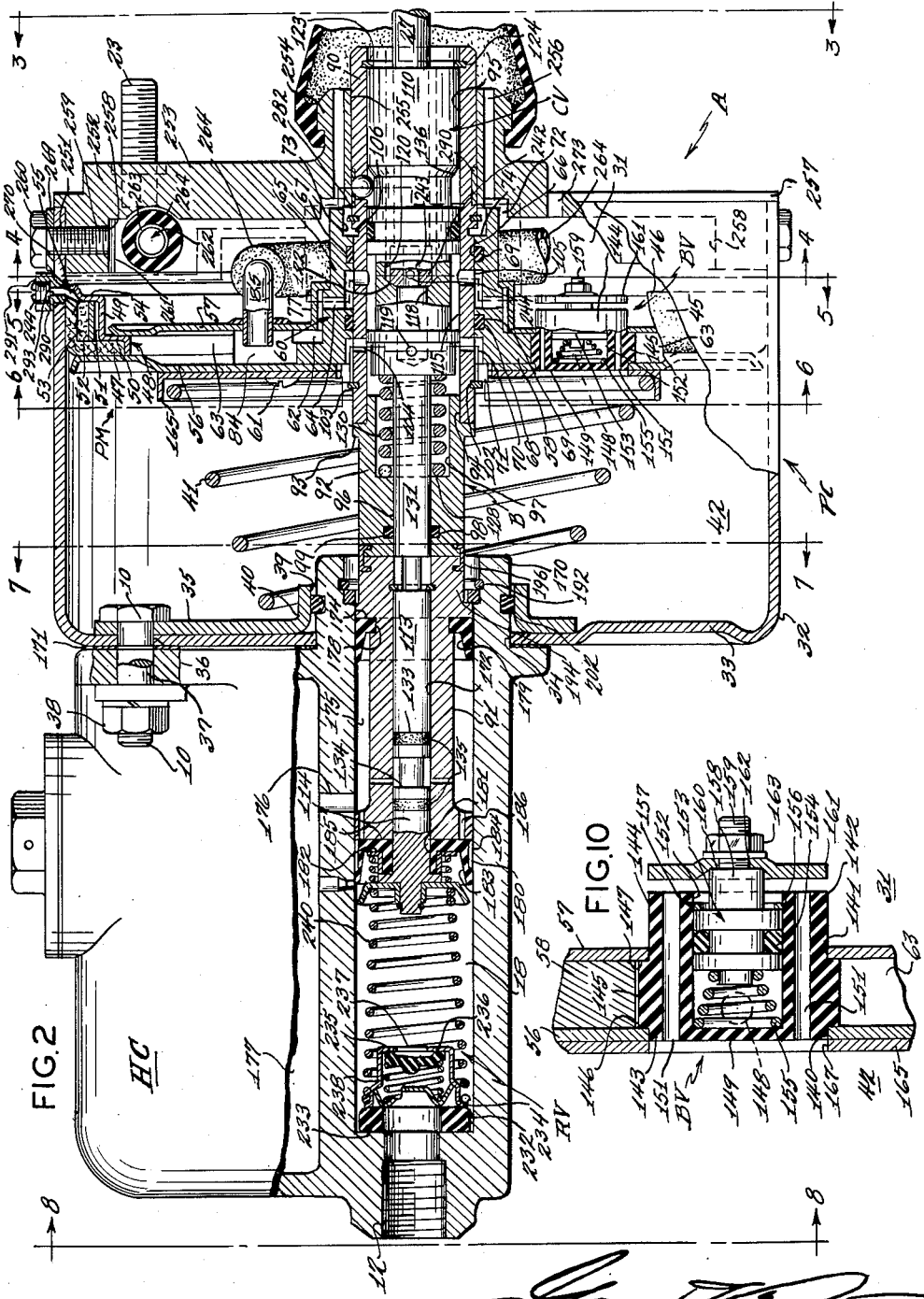
Inventor

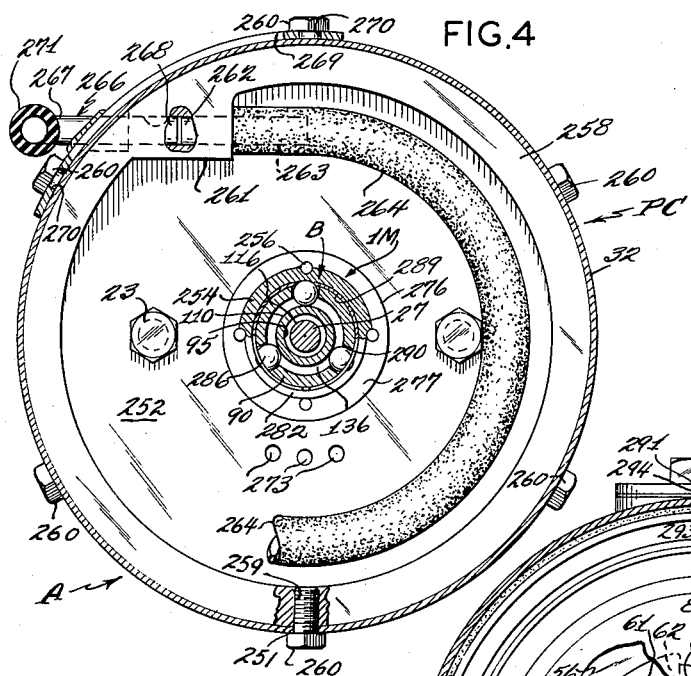
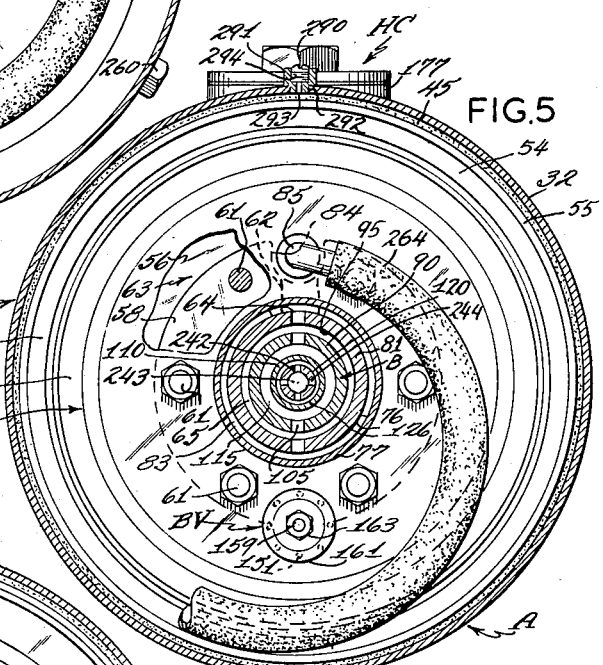
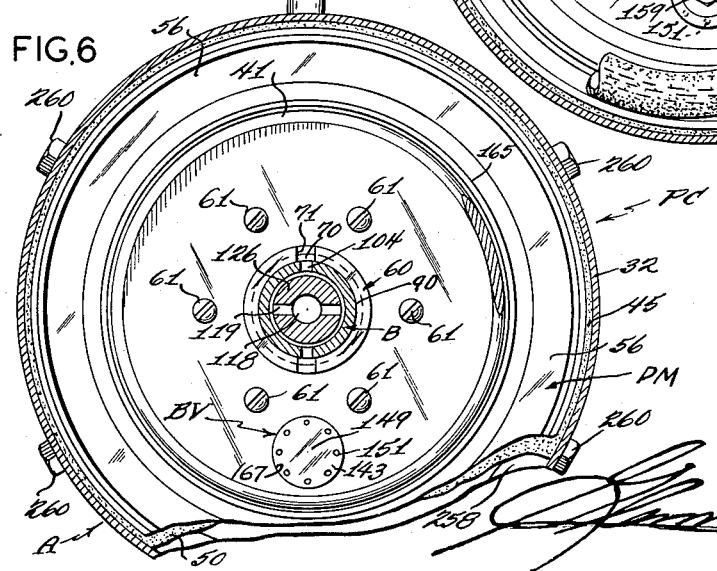

Nov. 27, 1962

G. T. RANDOL 3,065,603

POWER-ASSISTED OPERATING MECHANISM FOR
HYDRAULIC PRESSURE SYSTEMS

Filed May 8, 1957

Inventor

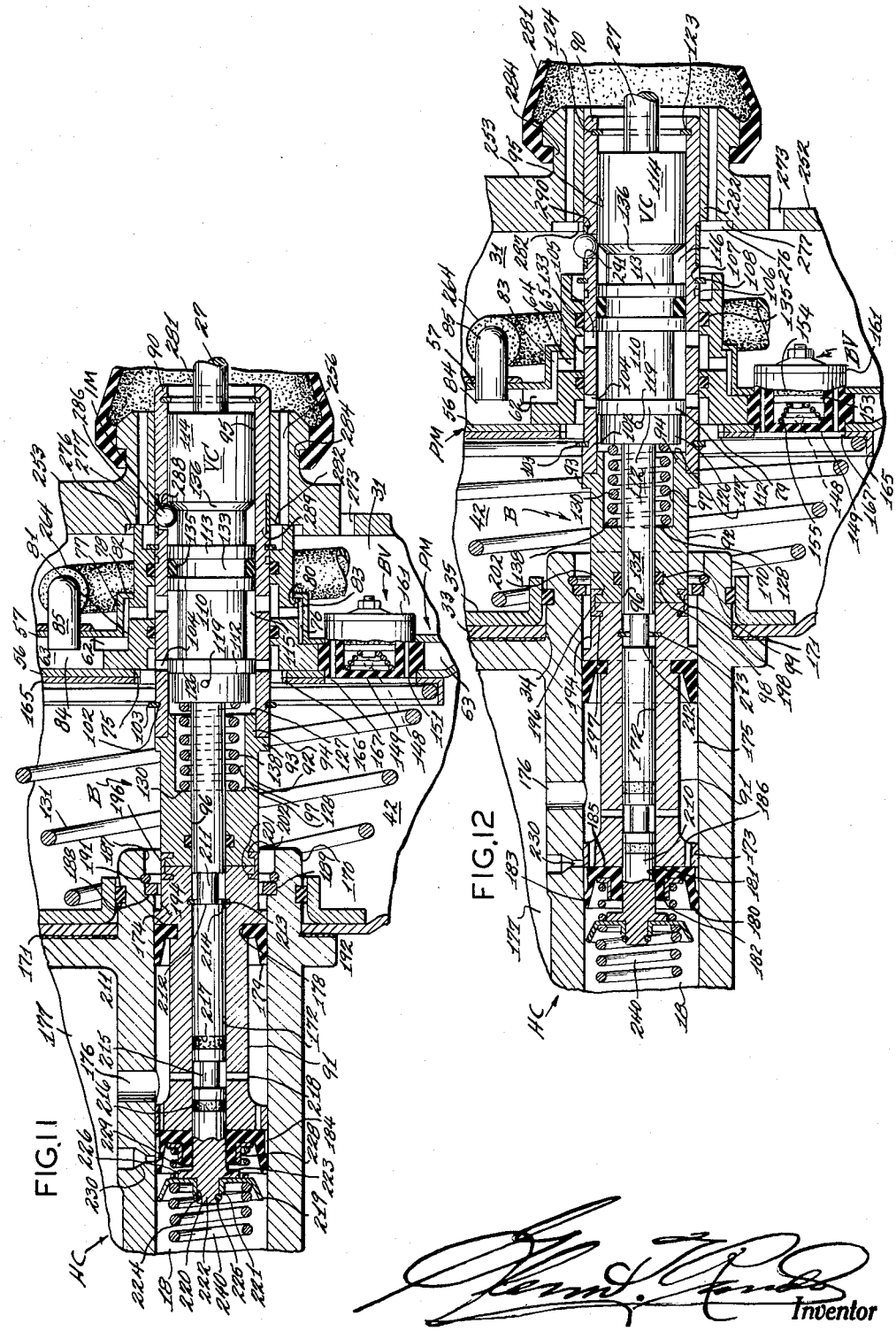

United States Patent Office 3,065,603
Patented Nov. 27, 1962

3,065,603
POWER-ASSISTED OPERATING MECHANISM FOR HYDRAULIC PRESSURE SYSTEMS
Glenn T. Randol, Mountain Lake Park, Md., assignor of fifty percent to Hamill-Markus Industries, Inc., Warren, Mich.
Filed May 8, 1957, Ser. No. 657,890
9 Claims. (Cl. 60—54.6)

The present invention relates to power-assisted operating mechanism in which physical operating force is supplemented by power assistance, said mechanism including a liquid pressure producing device which is intended primarily as an actuator for hydraulic braking systems of automotive vehicles and the like, although other uses are obviously feasible. The invention is related to and associated with the disclosure forming the subject-matter of my U.S. copending application Serial No. 636,193, filed January 24, 1957, now Patent No. 2,968,926.

Broadly, the present invention provides novel and improved power-actuated mechanism adapted to form a unitary assembly preferably with a substantially conventional hydraulic master cylinder, said mechanism having power control means responsive directly to an operator-operated member, such as a pedal, whereby power-actuation of the master cylinder becomes effective in accordance with the pressure applied to the member in controlling the control means after the master cylinder has been initially actuated by said member.

More specifically, the present invention contemplates a novel hydraulic braking system of the type under consideration which is appreciably improved over similar systems heretofore proposed, from the standpoint of durability, efficiency, and predictable braking control conducive to safety under all operating conditions of the vehicle and responses of the driver, and wherein the "feel" of slack taking up operation is substantially normal to that sensed from conventional pedal-operated hydraulic systems.

The primary object of the invention, therefore, is to provide means for attaining the ends recited in the preceding paragraphs.

Stated in more detail, it is an important object of my invention to provide novel power-operated means disposed between a hydraulic master cylinder of substantially conventional design and the associated driver-operated pedal, for controlling in part braking operations and transmitting to the driver via said pedal an awareness, or physical perception, of a portion of the total brake-applying hydraulic thrust engendered in response to incremental depressing and releasing movements of the pedal aforesaid for causing corresponding operations substantially of the power-operated means to assist in the actuation of the hydraulic master cylinder to apply and release the brakes, respectively.

The assembly referred to in the preceding paragraph incorporates novel arrangement of the parts whereby the piston of the hydraulic master cylinder includes a co-axially disposed piston of less cross-sectional area in operative engagement with the pedal via a control element for controlling the operating power to energize the power-operated means, said latter piston providing proportional hydraulic thrust on the pedal to the degree of total braking force effective in the hydraulic lines. A tubular member is slidably fitted or press-fitted with respect to the movable power member of the power-operated means whereby said member is effective on the master cylinder piston in a brake-applying direction of movement only or in brake-applying and releasing movements respectively, and the coaxial piston is operably connected to the pedal via the power control element, said latter connection providing limited relative movement of the pedal, control element and piston of less cross-sectional area with respect to the piston acted on by the power-operated tubular member with both of said pistons operably projectable into the pressure working chamber of the master cylinder. The movable power assembly, preferably of the piston-type, includes a novel one-way interlock operably carried by the power-operated tubular member and normally positioned between a fixed member and an element associated with the power control element whereby initial movement of the pedal in a brake-applying direction simultaneously actuates both pistons and tubular member to condition the pressure working cylinder for operation and to take up the slack in the system in readiness for power assistance; whereupon, said interlock is rendered ineffective automatically thereby releasing the power control element and piston of less cross-sectional area for limited relative movement with respect to the power-actuated piston to cause the latter piston to be actuated by the power-operated means to assist in the braking operation. The movable power assembly additionally includes abutment means between the power control element and power-operated member for limiting relative movement therebetween whereby operation of both pistons directly by the pedal is provided to apply and release the brakes independently of the power means as is understood or to supplement the power. With the power available, the pedal may be utilized for controlling the power control element of the power-operated device to operate the brakes with minimum operator effort required, with the braking force reacting on said pedal proportionally to the hydraulic line pressure, or by the brakes may be applied in usual manner prior to the power being made available as by subsequently starting the engine; whereupon, the movable power assembly becomes energized and moves to co-operate with the pedal in applying the brakes. In the event of complete power failure, the master cylinder reverts automatically to the factory-installed pedal control arrangement with minimum interference from the movable power assembly during such pedal braking operation, or optionally, the movable power assembly when fixed to the tubular member is actuated in accordance with pedal operations but adds slightly to the pedal load.

Therefore, a further important object of my invention is the provision of a novel positive one-way lock between the pedal actuated elements and the power actuated hydraulic pressure transmitting member or piston, preferably of tubular construction, for enabling operator initial movement of both pistons to condition the master cylinder pressure working chamber for operation and to take up the slack in the system substantially, whereupon, said lock automatically releases the pedal actuated elements for limited relative movement with respect to the power-actuated member to cause operative energization of the latter whereby power assistance is rendered effective in accordance with the pressure applied to the pedal to discharge liquid under pressure from the working chamber with the total hydraulic thrust reacting proportionally on the pedal via the elements actuated thereby.

A further important object related to the object immediately above is the provision of novel arrangement of the lock parts whereby upon release of the locking effect aforesaid normal relative movement control obtains between the pedal and power phases such that the lock cannot interfere with power-assistance or pedal application of the brakes in the case of partial or complete power failure, but upon full retraction or release of the pedal said lock is automatically rendered effective to connect the pedal and associated elements actuated thereby to the power-actuated member in readiness for another brake applying cycle.

A further salient feature of the present invention related particularly to the three objects immediately preceding, is the provision of novel relief or bypass valve means incorporated in the movable power assembly for automatically venting the vacuum power chamber to atmosphere in the event of power failure to enable free movement of the power assembly directly by pedal operation, and thus eliminate the "dash-pot" effect in the power chamber when the brakes are physically operated caused by compression resulting from working the air into and out of the power chamber via the restricted passageways associated with the vacuum-air power control valve responsive to such pedal movements. The relief valve means being responsive directly and solely to vacuum created in the engine-intake manifold or other source for vacuum production. With vacuum available (engine running) the relief valve means are closed placing control of the vacuum power chamber normally on the vacuum-air power control valve operated by the pedal, but should production or availability of vacuum become impaired or completely lost, the relief valve means open automatically to place the power chamber in communication with the atmosphere via the atmospheric chamber of the power cylinder so that pedal operations of the hydraulic master cylinder will not be hampered by such compressive resistance created when the air is worked into and out of the power chamber via the vacuum-air power control valve. It is, therefore, seen that the present invention provides for unrestricted movement of the power assembly during pedal operation of the master cylinder to limit the load on the pedal with respect to the power cylinder to the resistance offered by the power assembly return spring and friction created by the intimate contact of the leather piston seal with the inner surface of the power cylinder.

Another significant feature resides in providing a two-sectioned pressure applying assembly acted on by the movable power member, one of the sections being the master cylinder primary piston aforesaid, and the other section being the tubular member above referred to. With this arrangement, manufacturing procedure and installation of the hydraulic master cylinder on the power device cylinder are facilitated, however, the present invention contemplates use of a single tubular member for the purpose, that is, one portion projecting into the master cylinder pressure working chamber and the other portion extending into the power cylinder in engagement with the movable power assembly, as is understood. In the case of the two-sectioned tubular member, novel coupling means is provided to provide simultaneous movement of the two sections so that the parts maintain proper operative relationship at all times.

Another important feature of the present invention is the provision of a novel single pliant sealing member comprising a pair of concentric annular lips for isolating the hydraulic pressure chamber from the reservoir and power chamber in liquid pressure producing devices of the type under consideration which utilize a pair of coaxially disposed pistons, one being actuated by the power member and the other by the operator-operated pedal, thus the sealing member effectively prevents liquid under pressure from escaping past said pistons while enabling relative movement of the pistons to cause the power member to assist in building up pressure on the liquid in the chamber.

Another important feature of the present invention related to the aforesaid novel force-transmitting one-way piston interlock, provides for utilization of selectively weighed force-transmitting compression springs for returning the power control element or valve according to the desired resistance to pedal operation during the power phase, such spring also having the additional function of acting as a yieldable connection between the coaxially disposed pistons to enable initial movement of both pistons simultaneously to condition the pressure working chamber for operation prior to the power phase becoming effective in cooperation with or the elimination of the interlock means. In this latter arrangement, the spring would necessarily have to be of such pre-tension that both pistons would be moved in unison to close the compensating port between the reservoir and working chamber and then to take up the slack in the system thereby placing the brake shoes in contact with their respective wheel drums, and additional effort on the pedal is required to overcome the spring upon the master cylinder primary piston becoming arrested by pressure resistance in the working chamber to effect actuation of the power control valve relatively to the power-actuated hydraulic piston to bring the power phase in to assist the pedal operation in applying the brakes as is understood. Thus, it is seen that where the positive one-way locking mechanism is employed, initial movement of both pistons together is assured irrespective of the preloaded force of the force-transmitting spring to condition the working chamber for operation and bring the brake shoes into drum contact, at which point the valve return spring is additionally compressed during relative valve operation to bring the power phase into effect without sudden or erratic mergence with the initial pedal phase. Therefore, the novel positive one-way interlock provides for selectively weighted valve return springs according to the degree of initial pedal effort desired in bringing the power phase into operation with or without supplemental pressure reaction on the pedal-actuated piston.

The present invention also contemplates mounting the movable power assembly to accommodate limited relative movement of the connectable hydraulic thrust producing member by pedal operation in the event of power failure, and thus avoid the initial resistance offered by the power assembly return spring, or optionally, the movable power assembly may be fixed to the thrust producing member for movement therewith when no power is available with only slightly increased effort being required to overcome the return spring resistance. In the former instance, the power assembly would have a one-way connection with the hydraulic member in a brake applying direction only, while in the latter arrangement the movable power assembly would be fixed to the hydraulic member as by lock rings or press-fitting the hub portion thereof thereon.

It is a further special and novel feature of the present invention which, preferably, utilizes a piston-type power member reciprocable within the power cylinder, to associate with the annular sealing member forming the periphery of the piston, means on the exterior of the power cylinder casing for introducing a lubricant into intimate contact with the sealing member for absorption thereby where the member is made of permeable material, such as leather, to maintain its peripheral surface contact with the cylindrical surface of the power cylinder casing properly lubricated and thus enhance the seal between the surfaces aforesaid thus providing longer service life and lower frictional drag of the piston seal for maximum power utilization in operating the vehicles brakes. This feature is especially desirable in the event of power failure requiring driver operation of the brakes without power assistance, in which case, load on the pedal would be appreciably reduced to provide substantially normal operator effort.

In a more specific sense, the present invention seeks to adapt novel servo-mechanism in combination with substantially the standard components comprising a conventional hydraulic master cylinder, to operate said cylinder with reduced pedal effort, thereby enabling "pumping" or "feathering" control on long downgrades to prevent dangerous brake "fade," and, in the event of power failure the cylinder may be operated directly by the foot through the pedal in usual manner as is understood. However, it is to be understood that the present power device may be readily associated with master cylinders of special design which in some cases utilize a plunger in the working chamber of less cross-sectional area than the chamber.

With the foregoing and other objects and advantages in view, the invention consists of the new and novel combination, construction, and arrangement of parts as hereinafter more fully described, set forth in the claims appended hereto, and disclosed in the accompanying drawings forming part hereof, wherein:

FIGURE 1 is a schematic view of a side elevation of my improved liquid pressure producing mechanism constructed in accordance with the present invention, and exemplarily shown connected diagrammatically to operate a hydraulic braking system of an automotive vehicle or the like;

FIGURE 2 is a longitudinal sectional view on an enlarged scale, partly in side elevation, of the brake operating mechanism per se illustrated in FIGURE 1 wherein the vehicle brakes are in fully released condition;

FIGURE 3 is a rear elevational view of the mechanism taken from the line 3—3 of FIGURE 2 looking in the direction of the arrows, and showing details of the mounting studs for attaching the mechanism to the firewall of the vehicle;

FIGURE 4 is a transverse sectional view taken along the line 4—4 of FIGURE 2 showing details of the one-way clutch mechanism incorporated between the control valve and power member;

FIGURE 5 is a transverse view partly in section taken along the line 5—5 of FIGURE 2 looking in the direction of the arrows, and showing details of the vacuum inlet fitting and one-way interlocking mechanism associated with the power control valve on the atmospheric side of the movable power assembly:

FIGURE 6 is another transverse view partly in section taken along the line 6—6 of FIGURE 2 looking in the direction of the arrows, and showing the sub-atmospheric side of the power assembly including details of the valvular control therefor:

FIGURE 9 is a central fragmentary portion of FIGURE 4 on enlarged scale showing details of the one-way clutch mechanism incorporated between the control valve and power member;

FIGURE 10 is a fragmentary sectional view of FIGURE 2 showing the atmospheric relief valve in open position, said depiction being shown on an enlarged scale for clarity of detail:

FIGURE 11 is a fragmentary sectional view of FIGURE 2 on an enlarged scale of the operating parts in their positions corresponding to initial pedal depression; and FIGURE 12 is another fragmentary view similar to FIGURE 11 but showing the parts operated to positions causing power assistance in applying the vehicle brakes responsive to further depressing of the pedal.

Figure 7:
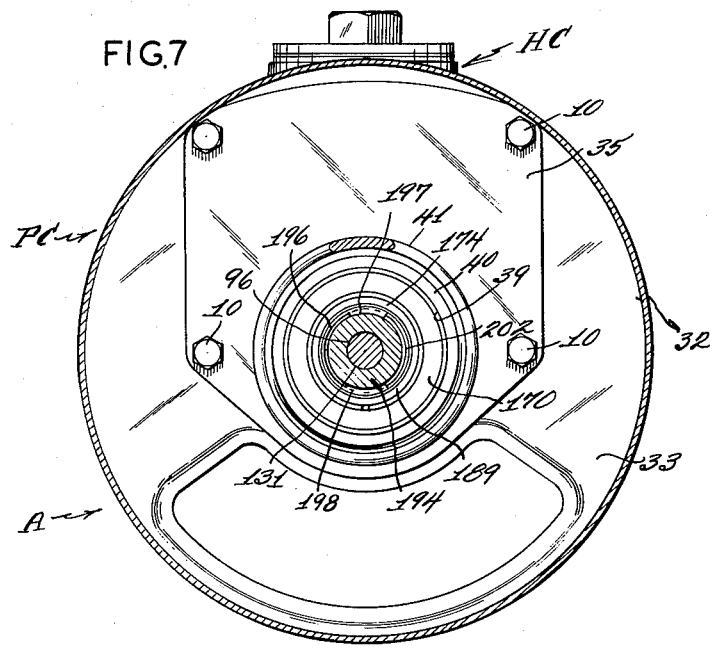
FIGURE 7 is another transverse view, partly in section, taken along the line 7—7 of FIGURE 2 looking in the direction of the arrows, and showing details of the master hydraulic cylinder mounting plate associated with the front end of the power cylinder.

Referring now to the drawings, and particularly FIGURES 1 and 2, my improved hydraulic pressure producing device generally designated A comprises a power cylinder PC, and a hydraulic master cylinder HC having an integral end flange 8 for preferably mounting it on one end of the power cylinder as by a plurality of bolts 10. The end of the hydraulic cylinder remote from the power cylinder has a discharge port 12 which is connected by one or more conduits 14 to one or more hydraulically actuated motors or wheel cylinders 16, the latter being employed to operate automotive wheel brakes generally designated WB as is understood.

The interior of the hydraulic cylinder HC is formed as a cylinder pressure working chamber 18, wherein the operating pressure for the wheel cylinders 16 is developed jointly by the force exerted by the power member assembly generally designated PM movable within the power cylinder PC and the force exerted by the operator on a pedal 20. The upper end of the pedal is, for example, pivotally supported at 21 on a bracket 22 secured as by hex nuts threaded on studs or bolts 23 between the vehicle firewall 24 and dash panel (not shown) in the operator's compartment of the vehicle, and at a point below the pivot 21 the pedal is pivotally connected as by pin 25 to a clevis or rod end 26 formed on the outer end of a thrust or push rod 27 to provide, for example, a 5 to 1 leverage ratio between the thrust connection aforesaid and a foot pad 28 at the lower end of the pedal 20. The studs 23 also serve to mount the device A on the engine side of the firewall, said studs projecting rearrearwardly from the power cylinder through suitable registering openings in the firewall and bracket whereby the tightened nuts make the device A rigid on the firewall with respect to the pedal bracket.

The power cylinder PC is preferably a differential air pressure operated servomotor, utilizing either vacuum or compressed air to produce the necessary pressure differential across the movable power assembly aforesaid to energize the same. In ordinary automotive installations, a vacuum-operated power cylinder is preferable to one operated by compressed air, since the conventional engine intake-manifold, such as shown fragmentarily at 30 in FIGURE 1, may serve as the vacuum source without imposing additional load on the engine.

The vacuum power cylinder PC in the preferred embodiment of the invention (see FIGURE 1) is atmosphere-suspended; i.e., air at atmospheric pressure is normally on both sides of the movable power member PM which may take the form of a solid piston or a flexible diaphragm, when the mechanism A is in released condition best demonstrated in FIGURE 2. Although a vacuum-suspended power cylinder is readily adaptable in the present invention, there are certain advantages accruing from the use of an atmosphere-suspended servomotor, as for example, chamber 31 of the power cylinder PC does not have to be sealed, since it is maintained at atmospheric pressure. That is to say, the angular movement of the control rod 27 during the pressure stroke of the device A does not create any structural problem in the design of the servomotor. Moreover, operation of an atmosphere-suspended cylinder is inherently smoother and less sensitive than the operation of a vacuum-suspended mechanism. On the other hand, speed of operation, which is the primary advantage of the vacuum-suspended arrangement, is not considered vital in installations where my improved pressure producing device A would most likely be used as against installations in heavy-duty installations such as buses, trucks, etc. Actually, a slowed more controllable build-up of power force during initial stages of vehicular brake application is conducive to preventing sudden stops particularly those stops during low vehicular speeds as when cruising in congested traffic-light controlled intersections, etc. The vacuum-cylinder comprises: a cup-shaped casing 32 closed at one end by a wall 33 through which a central circular opening 34 is provided, a reiforcing mounting plate 35 of similar configuration to the master cylinder flange previously referred to, is provided on the inside of wall 33 with four mounting bolts 10 rigid therewith which extend through registering openings 36 and 37 in the wall 33 and flange 8 aforesaid respectively for unitary assembly of the hydraulic cylinder with the power cylinder by nuts 38 threaded on the bolts, and a central circular opening 39 is provided in the plate with its marginal edge formed into an inturned annular flange 40 to provide a seat for one end of a normally preloaded helically formed return spring 41, usualy in practice of conical configuration as illustrated, with the other end acting on the confronting side of the movable power assembly PM for biasing the latter toward released position of FIGURE 2.

The movable power assembly PM, which is referred to in certain of the claims as a pressure-responsive movable wall, piston or member, has a normal released position spaced from the inside of the end wall 33 on which the master cylinder HC is mounted, to provide a control or vacuum-power chamber 42 within which the return spring 41 is operable disposed, said chamber being selectively communicable with the atmospheric chamber 31 and vacuum source 30 by foot-operated valvular control means generally designated CV to be hereinafter described in greater detail.

The power assembly PM comprises a flexible ring-type sealing member 45 having a peripheral portion 46 in frictional contact with the inner cylindrical surface of the casing 32 and an integral web portion 47 depending therefrom at right angles thereto, a metallic ring 48 of similar cross-sectional configuration for supporting the sealing member and having angularly disposed legs 49 and 50 corresponding to portions 46 and 47 respectively, with an annular channel 51 formed in leg 49 for reception of an expansible spring 52 acting radially outwardly on a ring oil wick 53 in contact with the inner side of portion 46 to maintain it saturated with oil and in frictional contact with the casing surface, the leg 49 projects slightly beyond the end of the portion 46 into an upturned marginal wall 54 having an offset peripheral portion to provide an annular channel 55 therebetween into which lubricant can be introduced from the exterior of the casing 32 as will appear, the portion 47 and leg 50 being impinged between the peripheral portions of confronting clamping plates 56 and 57 detachably secured in spaced relation with respect to an annular flange 58 intermediately disposed on an integral sleeve member 60 as by bolts 61, preferably six in number; the seal 45, ring 48, spring 52, flange 58, sleeve 60 and clamping plates 56 and 57 forming in assembled relationship portrayed in FIGURE 2, the movable power piston PM.

The flange-sleeve member 58, 60 is provided with radial vacum channels 62 in the rearward face of the flange in constant communication with the annular vacuum space 63 disposed between the plates, a port 64 through the wall of the sleeve in constant communication with an internal annular channel 65 provided in the surface of the longitudinal hollow or bore 66 through the sleeve, a pair of internal annular grooves 67 and 68, one on each side of the channel 65 in spaced relation thereto, for reception of a lubricating seal element 69, and spaced forwardly from the groove 67 is, for example, a pair of diametrically opposed vacuum-air channels 70 in constant communication with the power chamber 42 via longitudinally aligned slots 71 in the end of the forward hub portion forming the inner terminus of the sleeve 60, and the rearward hub portion 72 of said sleeve terminating with an annular internal recess 73 having an indented shoulder 74.

The clamping plates 56 and 57 are provided with central circular openings 75 and 76 respectively, with the marginal portion of the latter opening formed as by extrusion into a rearwardly extending sleeve 77 terminating as an inturned annular flange 78. The forward hub portion 79 of the sleeve 60 projects through the opening 75 while the rearward hub portion 72 projecting from the flange 60 is provided with an external annular shoulder 80 formed at the mergence of the normal diameter 81 and a reduced diameter 82 terminating at 72. The opening 76 through the sleeve 77 is larger than the normal diameter 81, and is adapted for the rearward hub portion 82 to project therethrough to place the shoulder 80 into intimate contact with the flange 78 thus providing an annular vacuum space 83 between the inner surface of the sleeve opening 76 and said normal hub diameter, to establish constant communication between radial channels 62 and port 64. A cutout 84 in the peripheral portion of the flange 60 receives the inner end of an angular rigid vacuum inlet fitting 85 secured to the exterior of plate 57 whereby vacuum communication is established from the exterior of plate 57 to space 63, radial channels 62, space 83, port 64, and channel 65.

A hollow pressure-transmitting or working member generally designated B is preferably made of two sections; namely, a force-transmitting tubular member or plunger 90 acted on by the power piston PM and pedal 20, which in turn engages a hollow piston 91 operably projecting into the working chamber 18 whereby the tubular member and hollow piston reciprocate in unison to operate the master cylinder HC as is understood. While this two section arrangement is preferred to facilitate assembly of the device A and lower manufacturing costs as well, use of an integral member for this purpose is entirely practical and contemplated, and in the patent sense certain of the claims define this broader concept.

The tubular member 90 which projects through the bore 66 of the sleeve member 60 in air-tight sealed relationship thereto, is rigidly fitted as by welding at its inner end with a hollow cylindrical element 92 formed with an annular external flange 93, a reduced diameter portion 94 thereof projecting into an axial bore 95 of the tubular member, a coaxial bore 96 merging with a counterbore 97 therethrough, said three bores being coextensive with said working member B, and an annular internal groove 98 in the surface of the longitudinal bore for reception of a sealing element 99. In spaced relation to flange 93 is an external annular groove 102 in the tubular member for reception of a split stop ring 103 engageable by the inner terminus 71 of the sleeve member 60 whereby the power piston PM, when energized, acts on the tubular member to project the hollow piston 91 into the hydraulic cylinder causing liquid under pressure to be displaced through the discharge port 12 to actuate the wheel cylinders 16 to apply and release the brakes WB. A first port 104 is provided through the wall of the tubular member in constant communication with its interior and the vacuum-air channel 70, and a second port 105 through the wall longitudinally spaced from portion 104, is adapted to establish constant communication between the tubular hollow and channel 65. A pair of spaced annular grooves 106 and 107 are provided in the outer surface adjacent the shoulder 74 of the sleeve member 60, for selective reception of a split retainer ring 108. Installation of the ring 108 in groove 106 locks the power piston to the tubular member for axial unison movement therewith while installation of the ring in the other groove 107 provides limited lost-motion movement between the tubular member and power piston, the latter arrangement serving a special and novel purpose to be more fully explained hereinafter.

The valvular control means VC comprise a valve element or piston 110 slidably fitted in the hollow 95 of the tubular member 90 for controlling operation of the power assembly PM. This valve is the spool-type and comprises three longitudinally spaced annular lands 112, 113, and 114 providing two annular spaces 115 and 116 therebetween, a closed end axial bore 118 which is intersected by a cross bore 119 through the wall of the valve, and a counterbore 120 merging with the bore 118 to provide an internal annular shoulder 122, and extending to the outer terminus of the valve element. A split retainer ring 123 engages an annular internal groove 124 in the surface of the bore 95 adjacent the outer end of tubular member 90 to establish the valve piston 110 and associated parts in their respective normal released positions best shown in FIGURE 2. A reduced extension 126 projects inwardly from the valve working land 112 in normally predetermined spaced relation with respect to the confronting end 127 of the element 92, and is adapted to limit the sliding movement of the valve element with respect to the tubular member 90 and for unison movement with said tubular member when brought into engagement with the shoulder 127. An internal annular shoulder 128 is disposed at the point of mergence between the longitudinal bore 96 and counterbore 97, and a normally preloaded helically formed compression spring 130 is operably disposed between the shoulder 128 and confronting end of the extension 126 for urging the valve piston 110 toward normal released position with respect to the tubular member 90 wherein the outer end of the valve element engages the retainer ring 123. A reduced stem portion 131 normally projects inwardly from the extension 126 through the encircling spring 130 and seal 98 to the end of the bore 96. Valve land 113 is provided with external annular groove 133 for incorporating lubricating seal element 135, and the inner end of the land 114 is formed as an angular cam shoulder 136.

An atmospheric chamber 138 is provided in the interior of the tubular member 90 and element 92 between the merging point of the bores 96, 97 and forward valve land 112. This chamber is connected at all times to atmosphere via the cross bores 119, axial bore 118, and counterbore 120, and selectively to the power chamber 42 via port 104, channel 70 and openings 71. Port 104 is controllable by the annular valve working land 112 to selectively connect this port to vacuum space 115 and to said atmospheric chamber 31, while port 105 is adapted to establish constant vacuum communication between channel 65 and said vacuum space 115. It is further noted that ports 104 and 105 are maintained in circular alignment with channels 70 and 65 respectively when the tubular member is in released position portrayed in FIGURE 2, or when moved relatively thereto as depicted in FIGURE 9 so that comunication between these channels and ports is never interrupted.

The piston clamping plates 56 and 57 have registering circular holes 140 and 141 respectively, medially disposed with respect to their inner and outer marginal portions for supporting a bypass or relief control valve generally designated BV comprising: a cup-shaped housing 142 formed on its exterior with two reduced diameter end portions 143 and 144 merging with a normal medial portion 145 to provide a pair of spaced shoulders 146 and 147 engageable with the inner face of the peripheral margins of the holes aforesaid in air-tight sealed relationship. The exterior of the portion 145 being disposed in the vacuum space 63 between the piston plates, and a port 148 is provided through the wall of the portion 145 for establishing communication between the space 63 and interior of the housing 142 adjacent the end wall 149 thereof. Circumferentially spaced within the circular wall of the housing 142 are a plurality of longitudinal atmospheric passageways 151 which connect the power chamber 42 and atmospheric chamber 31, when open. A cylindrical bore 152 closed at one end by the wall 149 is fitted with a reciprocable piston 153 equipped with an annular sealing member 154, said piston being biased toward the open end of the bore by a normally preloaded compression spring 155 preferably of conical configuration to conserve space, disposed between the piston and end wall. An internal annular groove 156 is provided in the surface of the bore 152 adjacent the open end thereof for reception of a split retainer ring 157 to limit displacement of the piston 153 by the spring 155. The piston is formed on its end opposite the spring-acted on end with a reduced shank 158 having a reduced threaded end portion 159 to provide a shoulder 160 therebetween. A movable valve plate or disc 161 is centrally apertured at 162 to receive the threaded portion therethrough, and a nut 163 locks the disc against the shoulder 160 whereby the piston 153 and valve disc 161 are locked in a unitary assembly. The inner face of the peripheral portion of the valve disc 161 is normally spaced from the atmospheric ends of the passageways 151 in confronting relation, to establish atmospheric communication between chambers 31, 42, but upon evacuation of the air from annular space 63 when the engine is running, the piston 153 is energized by differential pressures acting thereagainst causing the piston to move leftward against the bias of spring 155 and cover the atmospheric ends of said passageways thus isolating chamber 31 from chamber 42 whereby the latter chamber can be evacuated of air by the foot-operated slide valve 110 to cause the atmospheric pressure within chamber 31 to move the power piston assembly PM in a brake applying direction. It is thus seen that when vacuum production is available from the engine, the power chamber 42 is conditioned to enable power braking assistance, but should vacuum production fail, due to stalling of the engine or otherwise, the bypass valve BV automatically opens to place the chambers 31, 42 in atmospheric communication so that foot-operation of the power assembly PM is appreciably reduced by the free flow of air into and out of chamber 42 which eleminates resistance to free movement of the power piston created by having to work the air into and out of the power chamber 42 via the valvular control means CV. Thus in effect, the novel advantage provided by this bypass valve enables substantially no greater physical effort to operate the brakes without power assistance, than normally exerted in operating a conventional driver-operated hydraulic braking system.

A cup-shaped stamping 165 is carried on the outer side of plate 56 for reception of the larger end of the conical return spring 41, which stamping acts to center the spring action on the power member PM and is provided with registering holes for bolts 61, and a central circular opening 166 and a radially disposed opening 167 corresponding to openings 75 and 140 respectively, in the plate, the opening 167 being sufficiently large not to obstruct passageways 151 of the bypass control valve BV.

The hydraulic cylinder HC is provided with an annular hub portion 170 projecting from the flange 8, and extends through the opening 34 in the power cylinder end wall 33 concentrically disposed with respect to the cylindrical working chamber 18 and pressure transmitting member B. A gasket 171 is disposed between the confronting faces of the flange 8 and end wall 33, to render the power chamber 42 air tight. The axially bored piston 91 operably projects through said hub portion in coaxial relation thereto, said piston will be referred to in certain of the claims as a hydraulic piston or plunger, or a primary piston or plunger for flexibility in terminology, and is adapted to operably project in fluid-tight sealed relation into the cylindrical working or pressure producing chamber 18. The hollow piston 92 comprises; a spool-type assembly having an axial bore 172 therethrough, an annular head land 173, an annular shoulder 174 longitudinally spaced from the head land to provide an annular liquid space 175 therebetween and adapted to have uninterrupted communication via an intake port 176 leading to a liquid reservoir 177 associated with the hydraulic master cylinder HC. Adjacent the shoulder 174 is an annular groove 178 for reception of a ring cup seal 179 preferably made of flexible rubber. The end face of the head land 173 is equipped with a ring-type flexible cup seal 180 composed of molded rubber having a central opening 181 provided with an annular lip 182 concentrically spaced with respect to a peripheral lip 183 having a plurality of circumferentially spaced surface flutes 184, said lips being connected by a vertical web 185, the flutes and space 175 communicate by a series of longitudinal ports 186 adjacent the periphery of head land 173. The hub portion has a counterbore 187 co-axially disposed with respect to the cylindrical working chamber, to provide an internal annular shoulder 188 against which a stop washer 189 bears, the latter being secured in place by a split retainer ring 191 engaged in an annular groove 192 spaced from the washer, said washer also serving the additional purpose of limiting the operating stroke of the power piston PM and parts actuated thereby, when engaged by the flange 93. A reduced cylindrical portion 194 projects inwardly into engagement with the confronting end of the force-transmitting member portion 92 with the outer face of the shoulder 174 engageable with the stop ring 189 to limit displacement of the hollow hydraulic piston with respect to the working chamber 18. The confronting ends of the reduced portion 194 and force-transmitting member extension 91 are locked together for simultaneous axial movement by an open coupling ring 196 having radial spring action and provided with inturned spaced flanges 197 and 198 at its open ends in diametrically opposed disposition, said inner flange edges being arcuate in contour corresponding to the bottom wall of annular channels 201 and 202 disposed in spaced relation with respect to the ends of the hollow piston reduced portion and force-transmitting member, for reception of the flanges under radial tension to retain the coupling ring in effective axial locking position of the members aforesaid.

A secondary reactive piston or plunger 210 operably projects through the hollow piston longitudinal bore 172 and seal opening 181, in coaxial disposition with respect to the force-transmitting member 90, and includes a rearwardly extending stem 211 of reduced diameter providing a shoulder at 212 with the normal diameter of the plunger, said shoulder being engageable with a split retainer ring 213 fitted into an internal groove 214 in the surface of the hollow piston bore 172 adjacent the end of the hub portion 170, to establish the plunger 210 relatively to the hollow piston 91 in released position best shown in FIGURE 2. The end of the stem portion 211 engages the confronting end of the valve stem 131 for axial movement in unison therewith. An annular liquid channel 215 is provided on the plunger flanked by annular liquid retaining seals 216 incorporated in external grooves 217. A port 218 is provided through the circular wall of the annular space 175 to establish constant communication between this space and the channel 215 and to return any leaky liquid via intake port 176 to the reservoir 177.

The forward end of the rod 210 which projects into the pressure producing chamber 18 is fitted with a cup-shaped spring seat 219 by means of a central circular opening 220 therein provided with an annular flange 221 which receives a reduced diameter portion 222 terminating the forward end of the rod, said seat being secured in position against the shoulder 223 by a split retainer ring 224 engaging an external groove 225 adjacent the end of the portion 222. An external annular flange 226 is provided on the shoulder portion of said rod with its forward face flush with the shoulder aforesaid. A ring seal retainer 228 of substantially reversed L-shaped cross section lies between the lips 182 and 183 of cup seal 180 in contact with the forward surface of the web 185, to receive one end of a normally preloaded seal retaining spring 229 between the legs of retainer 228 with the other end of the spring engaging the back face of the spring seat 219, said spring encircling the flange 226 and the lip 182 and accommodates relative movement of the plunger rod 210 with respect to the hollow piston 91 when the slide valve 110 is operated to cause operative energization of the power member PM, and simultaneously exerts a biasing force against the cup seal 180 to maintain the same in contact with the face of the piston head land 173.

A metering bypass or compensating port 230 is provided between the liquid reservoir 177 and pressure working chamber 18 and is spaced forwardly of the intake port 176, slightly ahead of the forward edge of the cup seal peripheral lip 183 when the device A is in released position of FIGURE 2 to enable excess liquid in the hydraulic system to return to the reservoir and replenishment of liquid lost as by leakage, after a brake-applying operation. This bypass port is closel by the cup seal lip when the lost-motion travel previously mentioned is taken up bewteen the tubular member 90 and power member PM to isolate the reservoir liquid and thus condition the pressure working chamber 18 to pressurize the liquid and displace it through discharge port 12 into the wheel cylinders 16 to apply and release the brakes as is understood.

A removable valve seat 232 encircles the discharge port 12 and engages the end wall 233 of the pressure chamber 18. A residual pressure check-valve assembly of conventional construction is generally indicated at "RV" and comprises a cup-shaped casing provided at its open end, which is fitted with an apertured closure member, with an outturned annular flange 234 which movably engages the seat 232, said check-valve assembly having a selfcontained pressure discharge one-way check-valve 235 for enabling liquid under pressure to be displaced from the chamber 18 through the discharge port 12, and which co-operates with a seat 236 encircling an opening 237 through the end wall of the check-valve RV casing under the influence of a normally preloaded compression spring 238 reacting on said closure member. A normally preloaded compression spring 240 of preferable conical configuration is operably disposed between the spring seat 219 and flange 234 whereby its biasing action controls seating of the check-valve assembly RV and return of the plunger rod 210, control valve 110 primary piston 91 and tubular member 90 to their released positions, thus this spring may be termed a "valve control" and "reactive" spring for novel purposes which will become apparent in the course of the description to follow. In this connection, it should also be notel that spring 240 co-operates with spring 130 to return the slide valve 110 to brake "off" position portrayed in FIGURE 2.

The free end 242 of the valve push rod 27 is adapted to project into the valve counterbore 120 into engagement with the shoulder 122. An axial passageway 243 of limited depth from the end 242 is coaxially disposed with respect to more 118, and which is intersected by a series of cross passageways 244 to accommodate free passage of air through the counterbore 120. This arrangement enables unobstructed flow of air through said bore to the power chamber 42 when the brakes are being released in response to removal of pressure from the pedal 20. In this connection, however, it is desired to point out that were the passageways 243, 244 not incorporated in the end of the push rod, the brakes may be released since the pedal 20 moves faster than the withdrawal of the power member PM. This retracting movement of the pedal 20 would cause the free end of the push rod to be intermittently disengaged from the shoulder 122 provided at the inner end of the counterbore 120 thus enabling air to escape past the end of the push rod into the axial bore 118 and thence into the power chamber 42 via cross bores 119, port 104, channel 70 and openings 71 as the valve land 112 uncovers said port to cause the power piston PM to retract under influence of its return spring 41 supplemented by spring 240 toward released position shown in FIGURE 2. Accordingly, the spherical end of the push rod devoid of the passageways 243, 244, when engaged with the shoulder 122 to actuate the slide "valve" 110, acts as a valve to close the outer end of valve bore 118 thus supplementing the valve land 112 to prevent air from entering the power chamber 42 via port 104, but when the pedal is released by removal of foot-pressure thereon to take the brakes "off," the end of the push rod becomes intermittently slightly spaced or disengaged from the shoulder 122 to enable air to enter the valve bore 118 whereby the power piston PM can return to its released position according to pedal retraction. In practice, with the device A in fully released position, depicted in FIGURES 1 and 2, the working or free end of the push rod 27 is slightly spaced from the shoulder 122 to insure complete release of the mechanism.

Therefore, the present invention contemplates push rod construction having its valve working end with passageways 243, 244, or devoid of such passageways whereby the end of the push rod is so formed as to co-operate with a complemental surface on the shoulder 122 for venting bore 118 to atmosphere via counterbore 120 when the rod end disengages from the shoulder in response to release of foot-pressure on the pedal 20.

Adjacent the open end of the power cylinder casing 32 is a plurality of circumferentially spaced holes 251, preferably six in number, and a cover 252 formed, for example, as by a casting having an exterior embossment 253 into which the aforesaid mounting studs 23 are threaded or otherwise made rigid therewith for mounting the device A on the firewall of the vehicle as by the hex nuts threaded thereon, a centrally disposed hub 254, a longitudinal bore 255 through said hub, a plurality of air passageways 256 in said hub coextensive therewith, and a peripheral annular flange 257 which abuts the end of the casing 32. The interior of said cover is provided with a ring boss 258 extending inwardly from said flange and sized to fit snugly into the casing opening and thus close the same to form with the right side of the power member assembly PM, the atmospheric chamber 31 therebetween. Threaded radial holes 259 are provided through the boss in registry with the casing holes 251 and suitable fasteners such as the illustrated cap bolts 260 pass through the holes 251 in threaded connection with the holes 259 to secure the cover 252 to the casing 32 completing the assembly of power cylinder PC. An angular boss 261 merging with the ring boss 258 is provided with a rigid vacuum inlet tube 262 therethrough, the inner projecting portion 263 of the tube receiving one end of substantially a convolution of flexible conduit 264 leading from the tubular fitting 85 whereby vacuum inlet to annular space 63 and consequent movement of the power assembly PM are provided. An exterior rigid vacuum inlet fitting 266 comprising outer and inner tubular portions 267 and 268 respectively (see FIGURE 4) is made rigid, as by brazing, to an arcuate flange 269 having the same radius as the outer surface of the casing 32, and a hole 270 in each end. The inner tube portion projects through a suitable opening in the casing 32 into contact with the outer end of the tube 262 bringing the holes 270 in registry with two of the holes 251, preferably the first two from the top according to the vacuum inlet position required for the particular make of car as viewed in FIGURE 3. When the cap bolts 260 are threaded into locking position, the exterior fitting is securely held on the casing 32. The exterior portion of the fitting 266 is fitted with a flexible conduit 271 which connects to the rigid tubular fitting 272 threaded into the intake-manifold 30, thereby completing the vacuum line connection to the slide valve VC. A plurality, preferably three, of ports 273 are provided through the wall of the cover 252 to maintain atmospheric pressure within the atmospheric chamber 31. An annular recess 276 having an indented shoulder 277 is provided on the inside of the cover concentric with the hub 254 to accommodate engagement of the end of the rearward hub portion 72 and shoulder 277 to establish the power piston PM and connected parts in their respective normal released positions depicted in FIGURES 1 and 2, said passageways 256 having constant communication with the air holes 273 via the recess 276 whereby air at atmospheric pressure is inducted into the atmospheric chamber 31, said chamber being in constant communication with the interior of the slide valve counterbore 120 via the interior of a dust excluding flexible boot 281, passageways 256, annular recess 276, and air holes 273 to enable induction of air into the power chamber 42 when the slide valve VC is released to cause the power member PM to retract to fully released position portrayed in FIGURE 2. An angular cam surface 282 adapted to cooperate with valve cam 136 and disposed in spaced parallel relation thereto, is provided on the inner end of the longitudinal bore 255 for an important purpose to appear. The boot 281 is held at its rearward end by an integral end bead fitted into a channel 283 on the exterior of the push rod 27 and the forward end of the boot is connected to the exterior of the hub 254 by an internal end bead engaging an annular channel 284 on the hub.

A one-way clutch or interlock mechanism generally designated IM is operably disposed between the bore 255 and slide valve 110, and comprises a plurality of elements, preferably balls 286 movably disposed in equally spaced radial holes 288, preferably three in number, through the wall of the tubular member 90 in circular adjacency to the valve cam shoulder 136 in normal spaced relation rearward from the cam shoulder 282. An annular channel 289 is provided in the outer surface of the tubular member 90 in circular alignment with the radial holes, and fitted into this channel is a split ball retainer spring 290 having three holes 291 in radial alignment with the three holes 288 in the tubular member to prevent relative rotational displacement of the retainer out of alignment with the holes 288. The holes in this retainer being of slightly less diameter than the diameter of the holes 288, and therefore the ball diameter serves to prevent displacement of the balls radially outwardly when not engaged with the surface of the hub bore 255 as would be the case when the tubular member is actuated by either the power member PM or pedal 20 or both in a brake-applying direction best shown in FIGURES 9 and 10. The diameter of the balls 286 is substantially equal to the thickness of the tubular member wall and depth of the annular space 116 on the slide valve 110 which disposes the balls forwardly of cam shoulder 136 in confronting adjacency thereto to lock the slide valve 110 to the tubular member 90 in a brake-applying direction of movement, since the balls cannot be radially displaced outwardly while engaging the surface of the hub bore 255, but upon simultaneous movement of the tubular member 90, slide valve 110 and associated engaging parts acted on by spring 240 to the positions of FIGURE 10 the balls 286 radially displace outwardly by action of the camming shoulder 136 to release the slide valve 110 for limited relative sliding movement with respect to the tubular member 90 as defined by the split retainer ring 123 and annular shoulder 127 previously referred to.

Accordingly, it is seen that my novel one-way interlocking arrangement IM enables initial actuation of the master cylinder HC directly by the pedal 20 relatively to the movable power assembly PM accommodated by the split abutment ring 108 when installed in annular groove 107, but when this ring is installed in annular groove 106 the power member assembly PM also moves simultaneously with pedal actuation of the parts noted but with increased load on the pedal. The novel advantage gained by this arrangement provides the operator with the same initial pedal reaction as when the master cylinder is conventionally operated solely by the foot with no power assistance, to take up the slack in the system and condition the working chamber 18 to apply pressure on the liquid by closure of the bypass port 230. Upon the pedal operating the master cylinder to the conditioning position of FIGURE 9 which brings the abutment ring 123 only slightly spaced from the annular shoulder 74, additional pressure on the pedal 20 forces the balls 286 outwardly radially along the surface of the camming shoulder 282 and upwardly radially along the valve camming shoulder 136 to move the slide valve 110 progressively relatively as the tubular member 90 is advanced against the hydraulic thrust acting across the ends of the hydraulic piston 91 and plunger 210. This relative movement between the slide valve and tubular member is accommodated by the yielding of the valve return spring 130 which latter may be selectively rated with preference being toward a lighter action spring where the interlock IM is used, to reduce pedal effort during power assistance control. Thus, this novel one-way clutch arrangement removes critical preloading of the valve return spring 130 to the end of reducing operator effort in controlling the power phase with normal movement of the pedal required in the slack taking up operation with sufficient blocking action to prevent sudden inauguration of the power phase but rather a smooth mergence of the initial operator operation with power assistance to provide substantially a progressive increase of pressure on the pedal 20 caused by the hydraulic pressure across the forward end of the plunger 210 combined with the reactive spring 240 thus giving substantially a proportional reaction on the pedal to the total pressure within the chamber 18.

An oil filler plug 290 is threaded into a housing 291 having a reduced extension projecting through a hole 292 in the power cylinder casing 32 and secured thereto as by brazing. A passageway 293 is provided through the extension into the threaded counterbore 294 closed by the plug 290. The passageway is disposed in circular alignment with the power piston PM annular channel 55 when the piston is in fully released position as depicted in FIGURE 2. This arrangement enables introduction of a lubricant through passageway 293 into channel 55 which comes into intimate contact with the oil wick 53 for absorption thereby and thence impregnate the leather seal 45 to maintain the peripheral lip of the latter properly lubricated for proper sealing against the inner cylindrical surface of the casing 32 for long service life with maximum power effectiveness. Prior art power devices of the vacuum-actuated type require disassembly of the power cylinder to replenish the wick with oil, therefore, the present arrangement for oiling the piston seal from an external filler not only overcomes this serious objection to use of a piston-type movable power assembly but provides efficient long life service without loss of power plus ease of movement of the piston assembly by the vacuum or pedal or both.

*Operation*

The manner in which my improved pressure-producing device A operates is believed manifest from the foregoing description. However, in the interest of clarity a more detailed consideration will be given to the operational stages of this novel device as follows:

Assuming that the device A is installed on a motor vehicle as the present disclosure exemplarily demonstrates in FIGURE 1, to operate the hydraulic braking system commonly employed on such vehicles, in released "brake off" condition as depicted in FIGURES 1 and 2. With the enginge running, reduced pressure (vacuum) is produced within the intake-manifold 30 which is conveyed through conduits 271, 264 via chamber 63, channels 62, port 64, channel 65, port 105, to annular space 115 on the slide valve 110 thus substantially evacuating the air therefrom. The device is now conditioned for power operation. Initial depression of the pedal to the first dashed line position of FIGURE 1 simultaneously moves the slide valve 110, tubular member 90, hydraulic piston 91, and reactive piston 210 to the position of FIGURE 11 to condition the master cylinder HC for operation by closure of the bypass port 230 which isolates the reservoir liquid from that contained in the hydraulic pressure system 14, 16, 18 acted on jointly by the pistons 91 and 210. This simultaneous movement of the parts aforesaid is effected through pedal movement by the one-way clutch mechanism IM causing reactive spring 240 to increase its tension on the plunger 210, slide valve 110, and valve push rod 27. Continued pressure on the pedal 20 advances the hydraulic pistons 91 and 210 relative to the power member PM into a zone wherein the balls 286 of the one-way clutch IM are released for outward radial movement as portrayed in FIGURE 11, which in turn releases the slide valve 110 for limited relative movement with respect to the tubular member 90 to enable the valve working land 112 to open port 104 to exhaust the air from the power chamber 42 so that atmospheric pressure acting on the opposite side of the power member can energize the piston PM to move it forwardly in contact with the abutment ring 102 and thus provide power assistance in applying the brakes. The operator is apprised of the degree of braking pressure being developed before and after the power phase becomes effective by the combined reactive forces produced by the effects of the spring 240 which is characterized by increasing tension progressively induced in response to depressing the pedal from released position, and the hydraulic pressure acting on the end of the reactive piston 210. Initial movement of the pedal 20 requires an operator force on the foot pad 28 substantially equal to that of the conventional hydraulic cylinder HC devoid of power assistance. This initial operation conditions the pressure working chamber 18 as explained above to displace liquid under pressure via check-valve RV through the discharge port 12 into the lines 14 connected to the wheel cylinders 16 to apply the brakes as is understood. With the slack in the system substantially taken up in this manner, pressure reacting on the master cylinder piston 91 substantially arrest further pedal movement thereof and as a consequence additional pressure on the pedal 20 is required to overcome spring 130 to effect movement of the slide valve land 112 sufficiently to "crack" the port 104 enabling evacuation of the power chamber 42 via channel 69 and openings 70 and thus exhaust the air therefrom as is understood. This action sets up the aforesaid differential pressures across opposite sides of the movable power assembly PM causing the same to move leftward substantially proportional to the extent of pedal movement as illustrated in FIGURE 12.

The aforegoing operation completes what may be termed the "applied stage." With the brakes in applied condition, if the operator force on the pedal 20 is halted the movable power member PM will slightly advance in the brake-applying direction relatively to the reactive plunger 210 and slide valve 110 to produce what may be termed the "poised stage" at any applied position of the hydraulic piston 91. This latter operating stage is brought about by a "lapped" condition of the annular valve land 112 with respect to port 104 induced by aforesaid slight relative movement of the primary piston 91 with respect to the slide valve 110 in the event brake pedal movement is halted as exemplified in FIGURE 10 by the dashed line position of the valve land 112. Thus the brakes may be held "on" with minimum operator effort on the pedal 20 as a result of substantial counterbalance between the differential pressures aforesaid acting on the power piston PM and the existent hydraulic pressure in the hydraulic lines against the forward end of the hydraulic piston 91. If the servomotor PC should fail to be effective to provide power assistance, the force exerted by the operator on the pedal 20 will bring the inner end of the valve extension 126 into engagement with shoulder 127 on the element 92, enabling the operator to operate both hydraulic pistons of the device A with physical force alone to attain full displacement of liquid in the hydraulic system according to the braking force required. With the power phase effective, however, incremental depressing and releasing movements of the brake pedal 20 cause corresponding follow-up movements substantially of the movable power piston PC to apply and release the vehicle brakes WB in a manner replete in the brake art.

During the applying stroke of the primary piston 91, the reactive piston 210 is held forwardly relatively with the slide valve element 110 to enable port 104 to be held open, yet liquid pressure reaction on the reactive plunger 210 to the valve element 110 and thence to the pedal 20 via the push rod 27 is effective at all times during this applying position of the slide valve causing energized movement of the power piston PM in a brake-applying direction thus providing the operator with a "feel" of the degree of braking force in effect at all stages of the operating stroke of the hydraulic piston 91. This "feel" is different and improved over that provided by prior art devices for the same purpose in that a "controlled movement" of the reacting members is provided which simulates the resistance normally inherent with pedal-operated master cylinder of conventional design such as illustrated in the present disclosure. There is no tendency for the power phase to "over brake" at any given applied position of the pedal movement which contributes to the highly desirable feature of smooth stops at low vehicular speeds with instinctively predictable control. At higher speeds dangerous "grabbing" or "locking" of the wheels is prevented thus producing smooth vehicular deceleration with reduced operator effort in accordance with the pressure applied on the brake pedal.

The operational behavior of the reactive and return spring 240 referred to above is unique in that it produces control characteristics in the way of reaction against which the control valve piston 110 is adjusted to control energization of the vacuum-motor PC. This reaction increases above normal preloaded status of the spring in direct proportion to the distance the brake-pedal 20 is depressed from its solid line position in FIGURE 1, and therefore, such spring resistance alone would not necessarily have a magnitude correlated with the amount of braking force in effect at every position of the brake-pedal.

Figure 8:
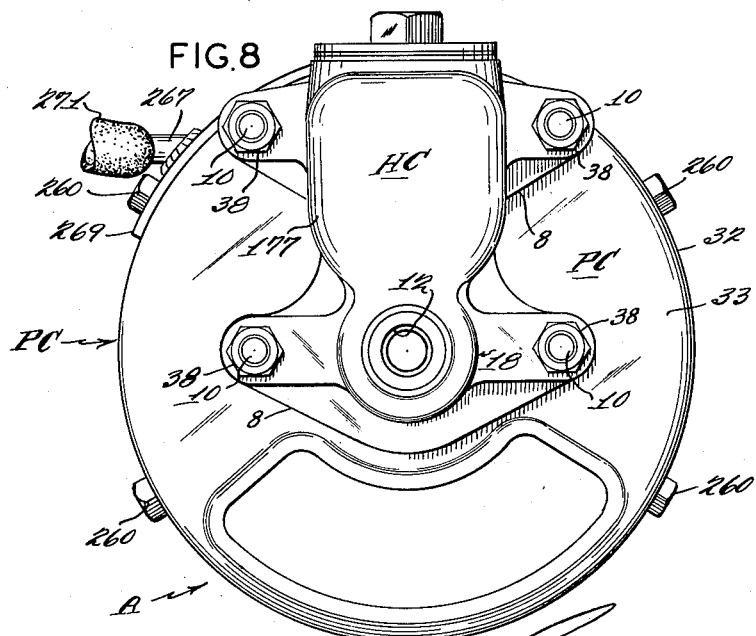
FIGURE 8 is a front elevation of the mechanism taken from the line 8—8 of FIGURE 2.

As this spring is additionally compressed above its normal preloaded status through the range of movement defined by FIGURES 2 to 11 or 12, it provides increasing resistance in relation to pedal movement up to the point the brake fluid becomes initially pressurized as defined by the thrust-transmitting capacity of the spring 130 in substantially preloaded condition best demonstrated in FIGURE 11, and thereafter, resistance becomes substantially constant on the pedal 20 as a consequence of the substantially stationary condition of the fluid-displacing unit (hydraulic pistons 91, 210) acting on the non-compressible column of brake fluid as is understood. Since the fluid becomes pressurized at different stations along the full operating stroke of the motor-actuated member B caused by wear on the brake linings and parts, and possible leakage in the hydraulic system, it will be appreciated that if the pressurizing state of the fluid to apply the brakes becomes effective toward the end of the full operating stroke aforesaid, that reaction from the spring 240 would not serve the purpose intended as effectively as when utilized through substantially the first-half of such operating stroke since the pedal 20 moved through so much idle travel before effective braking occurs would be operating at an abnormal rate thus bringing the power phase somewhat suddenly into effect with resultant erratic energization of the vacuum-motor PC at the critical point where smoothness of control is essential to prevent lurching induced by such power-surge.

It should be further observed that the magnitude of the reduced hydraulic reaction on the pedal 20 exerted by the pressurized fluid on the end of the reactive piston 210 can be varied in accordance with the diameter of such element. However, this reduced reactive force will always be proportional to the force with which the brake shoes are frictionally applied to the vehicle brake drums, to provide the operator with accurate sensing of the amount of braking force being applied. This hydraulic reaction principle is in sharp contrast to the control characteristics provided by spring 240 against which the control valve piston 110 is adjusted to control operative energization of the vacuum-motor PC since resistance to pedal depression of the pedal 20 increases in direct proportion to the distance it is depressed rather than pressure conditions to which the piston 210 is subjected.

In addition to the reaction control provided by spring 240, it also serves to control the residual pressure valve RV which limits the preloaded status thereof to approximately 6–12 # corresponding to the required residual line pressure, thus the magnitude of this spring would not be sufficient to provide the necessary reaction, but as the load on this spring is increased by movement of the pedal 20, for example, from its solid line position in FIGURE 1 to the first dashed line in this figure which corresponds to the position of the parts depicted in FIGURE 11, it provides increasing resistance on the pedal up to the point the brake fluid is pressurized under influence of operator effort exerted directly on the piston 210 and indirectly on the primary piston 91 via spring 130 according to the latters thrust-transmitting capacity defined by its preloaded status.

Accordingly, the reactive forces from the spring 240 and piston 210 are teamed together with the piston supplying the major portion of these combined diminutive reactions as a measure of the amount of braking force in effect at any given position of the pedal 20 at which the fluid is pressurized along its full range of movement while the reactive force from the spring becomes substantially constant at the point the fluid reaches such a pressurized state. Spring 240 also combines with the vacuum-motor piston return spring 41 acting through the detent mechanism 169, 175 to return the control valve parts and piston PM to their respective normal released positions shown in FIGURE 2, yet spring 240 does not interfere with movement of the power-piston PM in a pressure-producing direction since this spring is operated ahead out of engagement with the primary piston 91 in response to operator effort applied to the pedal 20 while the motor is energized.

Since reaction from spring 240 is effective to a limited extent defined by the control of the residual pressure valve RV and the distance the pedal 20 is moved to a point at which the brake fluid becomes pressurized under influence of the vacuum-motor PC, it serves to best advantage as a reaction means by utilizing its yielding resistance through substantially the first-half of the series of potential pressurizing movements aforesaid along the full operating range of the primary piston 91 which may be had by keeping the brakes properly adjusted and the system free of leaks which service operations contribute to safer driving. At pressurizing points beyond the halfway mark aforesaid of the piston 91, reaction from spring 240 would not sufficiently resist pedal movement to prevent power-surge from the vacuum motor PC resulting from the fast idle travel of the pedal in taking up such abnormal slack in the system before the motor PC could be energized to provide power assistance.

The primary hydraulic piston 91 which is operably projectable into the hydraulic pressure chamber 18 being substantially conventional in construction and operation, enables the operator to "pump" the brakes to prevent dangerous brake "fade" whether the power phase is effective or not. Thus on long downgrades the operation of the brakes may be carried out in cooperation with power assistance or independently thereof in the usual manner by "pumping" the pedal to introduce more liquid into the chamber 18 from the reservoir 177 via ports 186 and flutes 184, ports 186 being controlled by the valve washer 189 associated with the cup seal 180. During brake-applying movements of the primary piston 91, the pressure developed on the cup seal 180 is transmitted to the valve ring 189 to firmly seat said ring on the peripheral face of the head land 173 to thus close the forward ends of the ports 186 preventing escape of the liquid back to the reservoir 177 while under pressure within the chamber 18.

When pressure on the pedal 20 is removed, spring 240 acting on the forward end of the plunger 210 urges the plunger and slide valve 110 rearward relatively to the tubular member 90 and piston 91, in cooperation with the valve return spring 130, into engagement with the retainer ring 123 corresponding to released position shown in FIGURE 2 in which the power chamber 42 is in communication with the atmosphere. As air enters the chamber 42 via ports 273, chamber 31, recess 276, passageways 256, interior of boot 281, counterbore 120, passageways 244, axial bores 243, 118, cross bores 119, atmopsheric chamber 138, port 104, channel 70, and openings 71, the differential pressure is reduced, and eventually dissipated, enabling springs 240 and 41 to return the power piston PM and coaxially disposed thrust members to their respective released positions portrayed in FIGURES 1 and 2 wherein the end 72 of the sleeve member 60 engages the flange sleeve 277 and the abutment ring 103 engages the forward terminus 71 of the sleeve member 60 with the lost-motion movement between the abutment ring 108 and annular shoulder 74 restored in readiness for another braking cycle. If the ring 108 is installed in groove 106 the lost-motion feature is eliminated in favor of unitary movement of the power piston assembly PM and pressure-transmitting assembly B. In this latter arrangement, return spring 41 acts simultaneously on the power member PM and assembly B to return the same to released positon, prior to the effectiveness of the spring 240 on the pressure-transmitting member B. As previously pointed out, the spring 130 acts to return the slide valve 110 to released closed position after a brake-applying operation has been made. Spring 240 is effective under these circumstances to return the secondary piston 210 relatively to the primary piston 91 until the slide valve 110 engages the abutment ring 123 at which point spring 240 acts on the pressure-member B to supplement the action of the return spring 41 acting on the power piston PM engaged with the abutment ring 108 until the piston PM reaches its fully released position of FIGURE 2, this spring continues to act on the plunger 210, hydraulic piston 91, slide valve 110, and tubular member 90 to fully retract these thrust members until the lost-motion movement between the abutment ring 108 and shoulder 74 is restored with the forward abutment ring 103 engaging the forward terminus 71 of the sleeve member 60. It should be particularly noted here that as the slide valve 110 assumes its fully released position with respect to the tubular member under the influence of springs 130 and 240 as shown in FIGURE 2, the interlocking balls 286 are forced inwardly into contact with the cylindrical surface of the bore 254, camming shoulder 136 and the circular bottom of the annular space 116 by the inward camming action of the angular sleeve shoulder 282 acting on the opposite side of said balls, to thus return the balls to normal one-way locking position as depicted in FIGURE 2 in readiness for another brake-applying operation in the sequence of conditioning the working chamber, initial slack taking up in the system followed by mergence of the power assistance explained above.

During the return stroke, a predetermined pressure is retained in the hydraulic lines by means of the conventional residual pressure check-valve RV. If the pressure in chamber 18 falls below atmospheric pressure during the return stroke, liquid is drawn through ports 186 from the reservoir 177 past the ring valve 189 via flutes 184 across the seal lip into the chamber 18 to maintain said chamber filled. When the brakes are fully "off" or released as shown in FIGURES 1 and 2, the residual check-valve RV influenced to seat by the spring 240 will establish the minimum residual pressure in the hydraulic lines, such as, for example 5 to 10 p.s.i. and with port 230 open excess liquid in the system returns through said port to the reservoir and vice versa if additional liquid is required to fill the system. Therefore, the port 230 is termed a "compensating" port.

If the power phase is disabled for any reason, sufficient pressure on the pedal 20 causes the coaxial piston assembly 91, 210 to be operated by physical force alone in the well known conventional manner, with increased operator effort being required to overcome spring action and friction between the movable parts of the servo cylinder PC as is understood. Movement of the piston-type power assembly PM is facilitated by the open bypass valve BV, the friction between the leather seal 45 and inner cylindrical surface of the power cylinder offers little resistance to pedal movement due to adequate oil film conveniently introduced at will through hole 292, and the resistance caused by working the air via the valve element 128 into and out of the power chamber 42 is also eliminated by the open bypass valve BV. Thus, my improved brake operating mechanism A may be operated in usual pedal fashion with no additional force required over that normally employed in operating a conventional hydraulic braking system devoid of power assistance.

My improved device A is designed primarily for use in brake-actuating installations, such as found on motor vehicles, which are operated by a suspended-type pedal or treadle, rather than the conventional brake pedal extending through the floor of the driver's compartment. Use of the pendant-type pedal as the brake control member simplifies control of the brakes since the device A can be readily installed in the engine compartment on the firewall for accessibility and at the same time enables movement of the pedal pad 28 which the operator's foot engages in accordance with the mechanical advantage desired. That is to say, if a shortened travel is desired, connection of the push rod 27 is established closer to the pedal pad, while if a longer travel with increased mechanical advantage is desired, the connection aforesaid would be set closer to the pivot point 21 of the pedal. Where the travel of the pedal is shortened, greater reliance on the power operating phase must be made since the pedal pad is brought substantially in alignment with the normal released position of the adjacent accelerator pedal with consequent loss of mechanical advantage should the power phase become disabled for any reason while operating the brakes, or in applying the brakes before the engine is started to enable energization of the power cylinder PC. The low-pedal pad mounting aforesaid removes some of the time lag incident to the operator transferring his foot from accelerator to brake pedal and vice versa, and therefore, under certain driving conditions safety in control of the vehicle may be enhanced. However, actual experience in driving a car equipped with my novel pressure-producing mechanism, dictates that the longer pedal travel is conducive to better power-braking control through the full vehicular speed range, and added safety is provided should the power phase fail by having the increased mechanical leverage advantage instantly available to operate the brakes in usual pedal fashion without interference from the disabled power device PC. Furthermore, it is difficult to provide "feel control" in a brake operating device of the type under consideration without definite pedal movement, rather than a sensitive pedal travel which tends to cause sudden and erratic operations of the power device because the operator is deprived of a definite resisted movement of pedal control prior to the power becoming effective. It is this latter serious disadvantage common in prior art devices that my improved brake operating device basically seeks to overcome by providing sufficient brake-applying movement of the pedal prior to bringing in the power phase that sudden stops are avoided, the operator being able to blend the pedal action with the power phase to produce smooth brake applications under all driving conditions of the vehicle irrespective of the mode of pedal manipulation.

The aforesaid important advantage is provided in the present invention through the novel combination of a conventional hydraulic master cylinder associated with a new and novel power device directly controllable by an operator-operated pedal. While the prior art is replete with power-operated master cylinders of conventional or modified construction which utilize, for example, vacuum or compressed air actuation controllable by either manually or foot-operated valving remote from the master cylinder, the present invention places the pedal in novel direct mechanical relation to the parts adapted to control the action of the power device resulting in pedal control of the power phase simulating the normal "feel" when the master cylinder is operated solely by the pedal but with reduced operator effort being required.

A brief review of the operation of a conventional hydraulic master cylinder is believed apropos and is set forth below:

The master cylinder performs four essential functions, namely:

(1) Displaces liquid into the system, thus actuating the brake shoes into contact with the wheel drums.

(2) Develops the liquid pressure necesary for braking, when all shoes are in drum contact.

(3) Compensates for temperature changes or liquid seepage, thus maintaining the correct volume of liquid in the system.

(4) Charges the system with liquid upon each release of the brakes.

The reservoir 177 and pressure working cylinder 18 are joined by intake and bypass ports. A passage in the reservoir filler cap vents the liquid supply to atmosphere. The intake port is connected via passages in the head land of the piston to the pressure working chamber, said passages being conventionally controlled by a star-shaped reed valve, one leg for each passage, disposed between the primary cup seal and piston head face.

With the brakes "off," the piston is fully retracted as in FIGURES 1 and 2, the residual pressure check-valve at the outlet or discharge port of the pressure cylinder is closed, and the bypass port and cylinder intake port, connecting the cylinder with liquid supply, are open to enable liquid passage through the bypass port to compensate the system for changes in liquid volume; i.e., expansion or contraction due to temperature changes or leakage.

When the brakes are "applied," the pedal is depressed to force the piston and cup seal toward the outlet end of the pressure working cylinder. Initial movement of the piston and cup instantly forces liquid through the discharge port since the bypass port was closed by the peripheral lip of the cup when the pedal was initially depressed. With the bypass port sealed off the pressure working stroke begins. Pressure acting on the cup lip assists the cup to seal against a pressure leak past the piston. Pressure opens the residual pressure check-valve through which liquid is displaced into the hydraulic system and, after brake shoes contact their respective wheel drums, hydraulic pressures develop in accordance with the degree of braking effect desired.

During brake "release," the pedal returns to "off" position along with the piston influenced by return spring action both in the master cylinder and wheel cylinders. Returning liquid raises the entire residual check-valve from its seat, flowing around the valve to enter the pressure working cylinder. As the piston returns faster than this liquid can flow, a temporary vacuum is created in the pressure cylinder. This vacuum condition causes reserve liquid to enter the pressure cylinder through the intake port and passages in the piston head face and thence past the relaxed reed valve into the peripheral flutes on the lip portion of the seal. This additional liquid movement collapses the cup lip, flowing around it to help reduce the vacuum and supercharge the sealed system. As liquid continues to return from the wheel cylinders, the surplus returns to the reservoir through the open bypass port. Where the cylinder has an open end, a secondary cup on the piston rear bearing surface prevents leaks from the reservoir.

The residual pressure check-valve has two functions, namely:

(1) To maintain 6–12 p.s.i. hydraulic pressure in the system while the brakes are released, thus lessening the possibility of atmospheric leakage.

(2) To assist "bleeding" gases from the system by preventing the entrance of air during the bleeding operation.

The present invention contemplates installation of the residual pressure check-valve RV in the power unit, or conventionally at the outlet end of the hydraulic pressure chamber 18 or in a branch thereof.

In summary, the selective installation of abutment ring 108 in grooves 107 and 103 provides, respectively, normal initial pedal movement to close the compensating port 230 and thus take up the slack in the system with slight build up in the hydraulic pressure independently of the power member PM, or simultaneous movement of the power member and pedal with increased loading on the pedal. The lost-motion movement of the tubular member 90 with respect to the power member sleeve 60 may be varied to suit the amount of initial pressure build up in the system prior to the power phase becoming effective to assist the pedal, by adjusting the space between the abutment ring groove 107 and shoulder 74 to make the space therebetween wider or more narrowed according to initial pressure desired.

The bypass control valve BV provides novel advantages enabling movement of the power assembly by the pedal without appreciably increasing the load on the latter, particularly where a piston-type power member is employed in preference to commercial flexible diaphragms usually formed of molded rubber. This bypass valve functions to overrule restrictive working of the air to and from the power chamber 42 via the port 104 controlled by the slide valve land 112. Closure of this bypass valve to condition the power chamber 42 for control by the slide valve 110 is responsive to the generation of vacuum within the engine intake-manifold 30 rendering power assistance available while the engine is running, and the opening of this valve to enable unrestricted movement of the power member by the pedal 20 is automatic in response to cessation in the production of vacuum due to engine stoppage which places full control of the device A on the pedal as would be the normal condition were the hydraulic cylinder HC not associated with the power cylinder PC. However, it is desired to make clear that the bypass valve BV does not constitute an essential component of the present power unit for its operativeness, but when installed in a power brake servomotor of the type under consideration, particularly large diameter cylinders in heavy-duty installations, pedal operation is appreciably lessened from the standpoint of effort exerted by the operator when power assistance fails as by a hose line fracture, engine stalling, or need for application of the brakes while the vehicle is standing before starting the engine.

Further consideration is now given to the preferred timing of the release of the mechanical interlock IM in relation to the ability of the pedal 20 to operate the slide valve 110 to cause energization of the power member PM. The interlock balls 286 when moved with the tubular member 90 from their position of FIGURE 2 should circularly align with the inner edge of the annular cam shoulder 282 when the forward cup seal 180 has covered the compensating port 230. Further depressing of the pedal then advances the slide valve 110 relatively to a slower advancement of the tubular member 90 accommodated by the outward camming action of the balls against the shoulder 282 induced by the outward thrust of the balls by the slide valve camming shoulder 136 and the yielding of spring 130. During this latter operation it should be importantly observed that the rise of the balls 286 on the camming shoulders 136, 282 is resisted by the hydraulic pressure build up on the head ends of the plunger 210 and primary piston 91 after the port 230 has been closed in the manner explained above. This opposition to pedal movement is supplemented by the biasing action of the springs 130, 240, to sufficiently resist pedal operation that the operator, upon further depression of the pedal to bring the power phase into operation, can predictably effect mergence of the power phase with the initial pressure build up by the pedal, to produce a smooth full range of braking action as may be required. Thus, the rating of the spring 130 may be lighter than usually employed for the return of the slide valve 110 to closed position since by the time this spring is yielding to accommodate relative movement of the slide valve, hydraulic pressure reaction on the pedal has been built up in the manner above-described to enable continued depressing of the pedal to smoothly merge the power phase with the pedal phase so that an uninterrupted proportional reaction is effective on the pedal at all times during a brake-applying operation unaffected by the opposition to pedal movement provided by the spring 130. When the tubular member 90 and slide valve have advanced sufficiently to bring the interlock balls 286 laterally adjacent the outer edge of the camming shoulder 282, the slide valve 110 should be fully released for relatively movement with respect to the tubular member with the inner edge of the forward valve working land 112 minutely "cracking" the port 104 and completely isolating valve chamber 138, and the abutment ring 108 in close adjacency to the shoulder 74 but not actually contacting to prevent added load on the pedal prior to power effectiveness. Additional pressure on the pedal 20 will now act on the slide valve 110 to increase the opening in the port 104 and thus exhaust the air from the power chamber 42 causing the differential pressures acting on opposite sides of the power member or piston PM to move the piston forwardly into contact with the abutment ring 102, which restores the lost-motion travel between the ring 108 and sleeve 60, whereby power assistance is effective to control the brake-applying operation as is understood.

It is thus seen that the mechanical one-way clutch IM provides means for advancing the hydraulic piston 91 simultaneously with the slide valve 110 during initial pedal movement to condition the power mechanism PC for operation, the latter being locked out of operation until sufficient build up of pressure in chamber 18 has been effected solely by operator effort to produce smooth blending of the pedal and power phases without special pedal manipulation and/or caution being required on the part of the operator to prevent unpredictable sudden stops. During the power conditioning the hydraulic cylinder HC is also conditioned to produce pressure on the liquid by closure of the compensating port 230, and the action of the interlock balls 286 during release advances the piston 91 along with relative advancement of the slide valve 110 toward open position enabling use of a lighter rated spring 130 since the latter is not essentially involved in the required opposition to pedal movement throughout the full range of braking application initially established by the pedal alone with subsequent power assistance proportionally reacting on the pedal via the plunger 210, and slide valve 110 to provide substantially forty percent reduction in pedal effort with quicker stops at any given speed of the vehicle.

Considering the terminology used in the foregoing description and in the appended claims, the identifying expressions and/or terms employed are intended to convey meanings which include the range of reasonable equivalents in the patent sense. For example, the expressions "servomotor," "servo-mechanism," "power assembly," "power cylinder," "vacuum cylinder," "power device," "power means,' "power mechanism," are intended to include any casing and/or chamber having a pressure-responsive movable assembly therein, whether such assembly includes a piston, or a flexible diaphragm, or some other member serving the same purpose. The terms "front," "rear," "forward," "right," "left," and other directional words or characters are intended to have only relative connotation for convenience in describing the structure as illustrated, and are not intended to be interpreted as requiring any particular orientation with respect to associated structure external to the present disclosure.

Although it will be apparent that the preferred embodiment of the invention herein disclosed is well calculated to fulfill the objects above stated, it will be appreciated that I do not wish such to be limited to the exact construction and/or arrangement of parts shown, since it is evident that modifications, variations, changes and substitutions may be made therein without departing from the proper scope or fair meaning of the subjoined claims.

Having thus descried by invention, I claim:

1. In a brake booster system for fluid column operated brakes having a master cylinder and a supply reservoir therefor, fluid displacement means including an axially bored working member advanceable in such master cylinder to pressurize such column of fluid to a brake-applying pressure upon closure of a compensating port normally open between said supply reservoir and fluid column, a pressure differential actuated booster motor comprising a two-compartment power cylinder defined by a power member movable therein to vary the relative sizes of said compartments in which pressures are balanced to inactivate said motor, a source of pressure different from atmosphere to produce said pressure differences in said compartments to move said power member to advance said working member thereby activating said motor, an operator-operated member having a normally released position, control valve means including an element movably disposed in the axial bore of said working member for controlling said source to produce pressure differential in said compartments to move said power member in response to operating said operator member from released position, said valve element having a normal "off" position wherein said motor is inactivated and an operating "on" position wherein said motor is activated, a normally preloaded spring operably disposed in the axial bore of said working member to bias said valve element to its "off" position, an extension on said valve element movable therewith and projecting through the axial bore of said working member where the free end of said extension is exposed to hydraulic reaction from said column of fluid, and complemental abutting means carried respectively by said valve element and working member for limiting the relative working movement of said valve element, said abutting means being effective when said relative movement is taken up to transmit force exerted by the operator on said operator member directly to said working member to apply the brakes, the improvement which comprises: a one-way camming element fixed on said power cylinder; a one-way camming portion on said valve element; and positive clutch means having an element movably mounted in said working member between said camming element and valve element, said movable element being normally displaceable under actuation by said camming element into engagement with the camming portion on said valve element to connect the latter element and working member for limited movement as a unit, in response to initial operation of said operator member which disposes the forward end of said working member ahead of said compensating port to close the same whereby the master cylinder is conditioned to pressurize the column of fluid.

2. A brake booster system according to claim 1 in which said power member comprises: a solid piston assembly movable in said power cylinder in air-tight sealed relation, relatively thereto, and having a portion normally engaging a complemental portion on the power cylinder to establish its normally released position, a normally preloaded spring reacting between said power cylinder and piston to bias the latter to its released position, a central opening through said piston through which said working member projects in air-tight sealed relation, said working member having limited relative movement with respect to said piston, an internal annular groove adjacent the outer terminus of said axial bore, a split expansible ring engaging said annular groove for engagement by the confronting end of said valve element to limit displacement of the valve element with respect to said working member under influence of the first named spring, an external annular groove normally juxtaposed with respect to one of the end marginal portions of said opening through the piston, a split contractible ring engaging said last-named groove to receive thrust from said piston in a fluid pressurizing direction, a pair of annular external grooves, one of said grooves being juxtaposed with respect to the opposite marginal end of said opening through the piston, and the other groove being spaced from said one groove, another split contractible ring for selective engagement with said pair of grooves to lock the piston and working member for conjoint axial movement when said other ring is engaged with the one groove, and to enable limited relative movement between said working member and piston when said other ring is engaged with the other groove, and a radial hole through the wall of said working member longitudinally spaced from said pair of grooves for reception of said movable clutch element.

3. A brake booster system according to claim 2 in which said control valve means comprise: a first port through the wall of said working member for connecting the interior of said working member to said source; a second port through the wall of said working member spaced from the first-named port therein; an axial blind bore in said valve element closed at its inner end and open at its outer end to atmosphere; an atmospheric chamber at the inner end of said valve element; a passageway in said valve element connecting said atmospheric chamber to said axial bore; a vacuum chamber carried by said valve element in constant communication with the port leading to said source, a pair of longitudinally spaced annular lands on said valve element defining said vacuum chamber, one of said lands having a working relation with respect to said second-named port to selectively connect said vacuum chamber to said power chamber and to connect said latter chamber said atmospheric valve chamber in response to relative movement of said valve element with respect to said working member to activate and inactivate said motor respectively.

4. A brake booster system according to claim 1 including pressure balancing valve means connected directly to said source and having an element carried by said power member and movable relatively thereto for balancing pressures within said compartments on opposite sides of said power member upon failure of said source, and spring means including a normally preloaded spring opposing movement of said balancing valve element by differential pressures to render such pressures effective to operate said power member.

5. A brake booster system according to claim 1 in which said positive clutch means comprise: an external working surface emerging with the camming portion on said valve element; an internal working surface merging with a complemental camming portion on said fixed camming element; and a radial bore through the wall of said working member for reception of said clutch element which is normally confined between said two working surfaces in engagement with the camming portion on said valve element to lock the latter element and said working member for limited movement as a unit and thereby effect closure of said compensating port for the purpose in response to initial operation of said operator member, said camming portion on the fixed camming element being effective upon such initial unitary movement disposing said clutch element in circular alignment with said last-mentioned camming porton, to accommodate outward radial movement of said clutch element under actuation by said camming portion on the valve element, to release the clutch element out of engagement with said last-mentioned camming portion, and thereby enable relative movement of said valve element with respect to said working member to control operative energization of said motor in response to further operation of said operator member.

6. A brake booster system according to claim 5 including a normally preloaded spring in said master cylinder with one end bearing thereon and the other end reacting on the free end of said extension exposed to hydraulic reaction, to bias said extension and working member to their relative released positions, said last-mentioned spring being characterized by increasing reaction solely on said extension and control valve element progressively induced by operating said operator member from released position, and cooperatively effective to assist said control valve element spring to bias the latter element to its "off" position.

7. A brake booster system according to claim 1 in which said power member comprises: a solid piston which carries a peripheral flexible sealing element in intimate air-sealed relation with the internal surface of said power cylinder, an annular channel circularly disposed on said piston in close adjacency to said sealing element, an opening through the wall of said power cylinder normally in alignment wtih said annular channel when said power member is in released position to enable lubricant to be introduced therethrough into said annular channel to maintain said sealing element lubricated, and a closure plug for closing the outer end of said opening.

8. A hydraulic pressure-producing device, in which physical operating force is supplemented by power assistance, said device having a power cylinder, a master cylinder having a liquid reservoir, a discharge port in the master cylinder, a fluid pressure-responsive wall reciprocably mounted in the power cylinder to provide a variable power chamber therein to one side of said reciprocable wall, an axially bored pressure-transmitting member acted on by the reciprocable wall and having a liquid-displacing portion operably projecting into the master cylinder, a valve control element reciprocably mounted in the bore in said pressure-transmitting member, said valve element having a normal "off" position wherein the power cylinder is inactivated and an operating position wherein said power cylinder is activated, a reactive member movably disposed in the bore in said pressure-transmitting member in coaxially engaging relation with respect to the said valve element for movement together with the free end of said reactive member exposed to hydraulic reaction from the pressurized liquid in said master cylinder, liquid passageway means including a compensating port normally open between said master cylinder and reservoir for controlling liquid communication therebetween, means on the liquid-displacing portion of said pressure-transmitting member for closing said port to interrupt liquid communication between said master cylnider and reservoir in response to initial relative movement of said pressure-transmitting member, a normally preloaded spring operably disposed in the bore of said pressure-transmitting member and reacting thereon and said valve element to bias the latter toward its normal "off" position, and an operator-operated member having a normally released position for controlling said valve element opposed by its spring load, the improvement which comprises: one-way mechanical clutch means operably incorporated in the said pressure-transmitting member between said valve element and power cylinder to normally connect said valve element and pressure-transmitting member together for limited conjoint movement to close said compensating port in response to initially operating said operator member from released position; and another normally preloaded spring operably disposed in said master cylinder for reacting on said reactive member and pressure transmitting member simultaneously in a liquid-pressure releasing direction only, said spring being characterized by increasing reaction on said reactive member and valve element only progressively induced by operating said operator member from released position in a liquid-pressure producing direction.

9. In brake booster mechanism, including a pressure fluid operated motor having a casing provided with a movable wall actuated by pressure differential on opposite sides thereof, a source of pressure different from atmosphere, a master, a hydraulic fluid-displacement member operable in the master cylinder and connected with said wall for actuation thereby, a follow-up valve mechanism having one position to establish balanced pressures on opposite sides of the wall to inactivate said motor and a second position to establish differential pressures on opposite sides of the wall to activate said motor, operator-operated means connected to said valve mechanism to activate the same to for power-activation of said motor, and reaction means including a normally preloaded spring to oppose operator-activation of said valve mechanism, the improvement which comprises: a fluid passageway normally open through said wall to establish balanced pressures on opposite sides thereof; relief valve means operably carried by said wall and having a spring-loaded element movable relative to said fluid passageway to open and close the same; and another fluid passageway in continuous communication with said spring-loaded element and communicating directly with said source of pressure for operating said spring-loaded element to a position closing said fluid passageway to isolate opposite sides of said wall to render differential pressures effective thereagainst under control of said valve mechanism to power-activate said wall.

References Cited in the file of this patent

UNITED STATES PATENTS

| | | |
|---|---|---|
| 1,972,732 | Farmer | Sept. 4, 1934 |
| 2,006,487 | Srensen | July 2, 1935 |
| 2,532,960 | Stelzer | Dec. 5, 1950 |
| 2,642,165 | Banker | June 16, 1953 |
| 2,681,043 | Irwin | June 15, 1954 |
| 2,770,949 | Randol | Nov. 20, 1956 |
| 2,792,686 | Ingres | May 21, 1957 |
| 2,807,239 | Grant | Sept. 24, 1957 |
| 2,826,042 | Rike et al. | Mar. 11, 1958 |
| 2,842,101 | Price | July 8, 1958 |

UNITED STATES PATENT OFFICE
CERTIFICATE OF CORRECTION

Patent No. 3,065,603                            November 27, 1962

Glenn T. Randol

It is hereby certified that error appears in the above numbered patent requiring correction and that the said Letters Patent should read as corrected below.

Column 2, line 34, strike out "by"; column 3, line 72, for "weighed" read -- weighted --; column 4, line 20, for "together" read -- as a unit --; line 69, for "a" read -- the --; column 5, line 49, after "on" insert -- an --; column 6, line 2, for "cylinder" read -- cylindrical --; line 18, strike out "rear-"; line 64, for "reiforcing" read -- reinforcing --; same column 6, line 75, for "usualy" read -- usually --; column 7, line 56, strike out "72"; line 57, after "terminating" insert -- at 72 --; same column 7, line 65, strike out "72"; column 9, line 57, for "are" read -- is --; column 10, line 32, for "a" read -- the --; column 11, line 14, for "ring" read -- washer --; line 49, for "leaky" read -- leak-by --; column 12, line 12, for "closel" read -- closed --; line 13, for "bewteen" read -- between --; same column 12, line 39, after "110" insert a comma; column 14, line 7, for "VC" read -- 110 --; column 17, line 1, for "PC" read -- PM --; column 19, line 2, for "ring", each occurrence, read -- washer --; line 71, for "ring" read -- washer --; column 20, line 24, for "a" read -- the --; column 21, line 4, for "a" read -- the --; line 18, for "a" read -- the --; column 22, line 18, for "103" read -- 106 --; column 24, line 21, for "descried" read -- described --; column 25, line 64, for "emerging" read -- merging --; column 27, line 14, after "master" insert -- cylinder --; line 22, strike out "to"; column 28, line 4, for "relative" read -- relatively --; line 17, for "Srensen" read -- Sorensen --.

Signed and sealed this 20th day of April 1965.

(SEAL)
Attest:

ERNEST W. SWIDER                          EDWARD J. BRENNER
Attesting Officer                        Commissioner of Patents